United States Patent (10) Patent No.: US 6,720,937 B1
Neugart et al. (45) Date of Patent: Apr. 13, 2004

(54) COMBINATION INSTRUMENT

(75) Inventors: Elmar Neugart, Ladybrand (ZA);
Gerhard Over, Bad Dürrheim (DE)

(73) Assignee: Mannesmann VDO AG, Frankfurt (DE)

( * ) Notice: Subject to any disclaimer, the term of this patent is extended or adjusted under 35 U.S.C. 154(b) by 392 days.

(21) Appl. No.: 09/684,740

(22) Filed: Oct. 5, 2000

(30) Foreign Application Priority Data

Oct. 7, 1999 (DE) .......................................... 199 48 491

(51) Int. Cl.[7] ................................................. G09G 5/00
(52) U.S. Cl. ........................ 345/1.1; 348/837; 340/461
(58) Field of Search ............................. 345/1.1, 1.3, 5, 345/905; 340/461–462; 348/837, 836, 840; 361/681

(56) References Cited

U.S. PATENT DOCUMENTS 4,983,951 A * 1/1991 Igarashi et al. ............. 340/461
5,361,165 A * 11/1994 Stringfellow et al. ........ 359/631
5,461,361 A * 10/1995 Moore ......................... 340/461
6,039,141 A * 3/2000 Denny ......................... 180/329
6,181,387 B1 * 1/2001 Rosen ......................... 348/837
6,448,893 B1 * 9/2002 Dobberkau et al. ......... 340/461

FOREIGN PATENT DOCUMENTS

DE 3726938 2/1989
EP 0338405 10/1989

* cited by examiner

Primary Examiner—Richard Hjerpe
Assistant Examiner—Francis Nguyen
(74) Attorney, Agent, or Firm—Martin A. Farber

(57) ABSTRACT

In order to improve the readability of analog or digital display units (2a, 2b, 3) arranged in a combination instrument, 1 that either at least one of the display units (2a, 2b, 3) can be pivoted about at least one spatial axis (X, X1, X2, X', Y, Y1, Y2, Y') by a drive arranged in the combination instrument (1), 2 or that at least the front side of the housing of the combination instrument (1) is subdivided into a plurality of subregions (A, B, C), and that at least one of these subregions (A, B or C) can be pivoted together with the display units (2a, 2b, 3) integrated in it.

5 Claims, 1 Drawing Sheet

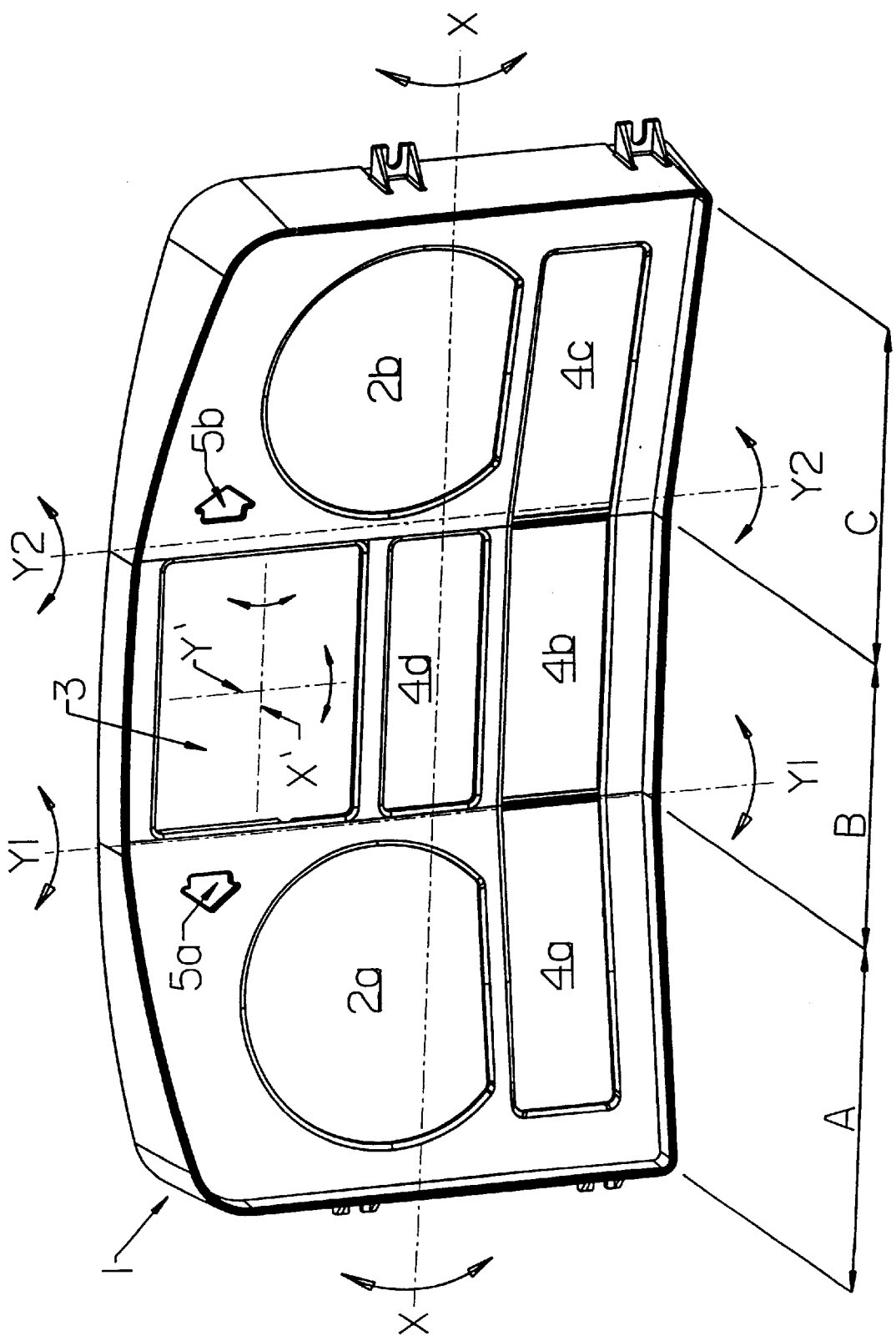

COMBINATION INSTRUMENT

FIELD AND BACKGROUND OF THE INVENTION

The invention relates to a combination instrument in a configuration as it is used in the dashboard of motor vehicles, in particular of passenger vehicles, trucks and buses. Combination instruments of this type have, in addition to a certain number of warning luminaires, diverse analog and digital display units in order to indicate for example the vehicle speed, the engine speed and other measured values and operating states of apparatuses arranged in the vehicle.

In this context, the display units are conventionally fitted rigidly in the housing of the combination instrument. The combination instrument itself is also conventionally fitted rigidly in the dashboard of the motor vehicle. On account of the rigid fittings mentioned, however, parallax errors and errors caused by lack of definition can occur during the reading of the display units, because the individual position of the driver's eyepoint varies depending on said driver's sitting position and physique. Particularly when LCD technology is used to form one or more display units in which error-free reading is possible only within a predefined viewing angle, the rigid arrangement of display units in combination instruments is disadvantageous because the usability of the display units is thereby subject to a considerable restriction and is unavoidably dependent on characteristics of the driver.

SUMMARY OF THE INVENTION

The object of the present invention, then, is to present a combination instrument having integrated diverse analog and digital display units in which the readability of the display units can be individually optimized for any arbitrary position of the driver's eyepoint, to be precise particularly when the display units have a restricted viewing angle for their readability on account of the technology used for them.

The object is achieved for a combination instrument of the generic type by virtue of the fact that at least one of its display units can be pivoted about at least one spatial axis by a drive arranged in the combination instrument. The dependent claims relate to refinements of the solution that has been found, namely that the display units can preferably be pivoted in two spatial planes, whole subregions of the housing of the combination instrument can be pivoted together with the display units integrated therein, and the display units can be pivoted by at least one servomotor which can be controlled by the driver.

BRIEF DESCRIPTION OF DRAWING

The solution that has been found will now be explained in more detail with reference to the single accompanying FIGURE which is a perspective view of a combination instrument of the invention.

DETAILED DESCRIPTION OF THE PREFERRED EMBODIMENT

The FIGURE shows, by way of example, a generic combination instrument 1 which can be incorporated as a structural unit in the dashboard of a vehicle and has two analog display units 2a and 2b, a digital display unit 3 designed using LCD technology, and four different panels 4a, 4b, 4c and 4d for diverse warning luminaires. Direction indicators in the form of arrow luminaires 5a and 5b are also illustrated. In this case, at least the front side of the combination instrument 1 is divided into three subregions A, B and C each containing some of the display units mentioned above. However, said subregions A, B and C can also be realized by housing sections which are intrinsically independent and are connected to one another in a positively locking manner yet in a manner such that they can move relative to one another in at least one spatial direction, and, taken together, form the combination instrument 1. In the preferred embodiment, the subregion B of the housing is intended to be rigidly connected to the dashboard of the vehicle, whereas although the subregions A and C can be enclosed in a positively locking manner by the dashboard, they are nonetheless not rigidly connected to the dashboard.

Drives are provided in the housing of the combination instrument 1, said drives pivoting either an individual display unit, such as the digital display unit 3, or whole subregions of the housing of the combination instrument 1, such as the subregions A and C with the display units 2a and 2b respectively integrated therein. The pivotability is preferably effected in two spatial planes. As illustrated, the digital display unit 3 is intended to be pivotable about the horizontal spatial axis X' and the vertical spatial axis Y'. In accordance with the example shown in the FIGURE, the subregion B of the combination instrument 1 is pivotable about the horizontal spatial axis X, the subregion A about the vertical spatial axis Y1 and the subregion C about the vertical spatial axis Y2. However, the combination instrument 1 can also be designed in such a way that its subregions A and C can also be pivoted about the horizontal spatial axis X in addition to the vertical spatial axes Y1 and Y2, respectively. The pivoting is preferably effected by electrical servomotors which are arranged in the housing of the combination instrument 1 and can be controlled by the driver by means of an operating element (not illustrated in the FIGURE). However, instead of the servomotors, other kinds of drives or suitable mechanical constructions can also be provided for the pivoting.

What is essential to the solution that has been found is that either whole subregions of a generic combination instrument which can be fitted in the dashboard of a vehicle or individual display units integrated in the housing of the combination instrument can be pivoted by drives which can be operated by the driver in order to adjust the viewing angle of the display units for their optimum readability in accordance with the individual requirements of the driver.

We claim:

1. Combination instrument having analog and/or digital display units (2a, 2b, 3), wherein at least one of the display units (2a, 2b, 3) is pivotable about at least one spatial axis (X, X1, X2, X', Y, Y1, Y2, Y') by a drive arranged in the combination instrument (1), wherein the display units (2a, 2b, 3) are pivotable in two spatial planes.

2. Combination instrument according to claim 1, wherein at least a front side of a housing of the combination instrument (1) is subdivided into a plurality of subregions (A, B, C), and at least one of said subregions (A, B or C) is pivotable together with the display units (2a, 2b, 3) integrated therein.

3. Combination instrument having analog and/or digital display units (2a, 2b, 3), wherein at least one of the display units (2a, 2b, 3) is pivotable about at least one spatial axis (X, X1, X2, X', Y, Y1, Y2, Y') by a drive arranged in the combination instrument (1), wherein the display units (2a, 2b, 3) or a plurality of subregions (A, B or C) of a housing of the combination instrument (1) are pivotable by at least one servomotor which is controllable by a driver.

4. Combination instrument according to claim 3, wherein the display units (2*a*, 2*b*, 3) are pivotable in two spatial planes.

5. Combination instrument according to claim 3, wherein at least a front side of the housing of the combination instrument (1) is subdivided into the plurality of subregions (A, B, C), and at least one of said subregions (A, B or C) is pivotable together with the display units (2*a*, 2*b*, 3) integrated therein.

* * * * *